US008584705B2

(12) United States Patent
Hughes et al.

(10) Patent No.: US 8,584,705 B2
(45) Date of Patent: Nov. 19, 2013

(54) BIDIRECTIONAL SLEEVED/PLUG BALL CHECK VALVE

(76) Inventors: Richard C Hughes, Santa Fe, TX (US); Melvin O Castillo, Santa Fe, TX (US); James C Hertenberger, Santa Fe, TX (US)

( * ) Notice: Subject to any disclaimer, the term of this patent is extended or adjusted under 35 U.S.C. 154(b) by 151 days.

(21) Appl. No.: 12/762,313

(22) Filed: Apr. 17, 2010

(65) Prior Publication Data
US 2011/0253922 A1 Oct. 20, 2011

(51) Int. Cl.
*F16K 5/10* (2006.01)
*F17D 3/01* (2006.01)

(52) U.S. Cl.
USPC .................. 137/614.17; 137/269.5; 137/558; 251/192; 251/315.01

(58) Field of Classification Search
USPC ........................ 137/141, 599.17, 601.16, 558, 137/614.16–614.18, 614.2, 270.5, 269.5, 137/584; 73/332, 333; 251/315.01, 192
See application file for complete search history.

(56) References Cited

U.S. PATENT DOCUMENTS

| | | | | | |
|---|---|---|---|---|---|
| 181,127 | A * | 8/1876 | Ashcroft | | 73/332 |
| 372,848 | A * | 11/1887 | Graham | | 73/333 |
| 375,409 | A * | 12/1887 | Barclay | | 73/333 |
| 453,814 | A * | 6/1891 | Loughry | | 137/269.5 |
| 506,564 | A * | 10/1893 | Stulp | | 73/333 |
| 546,589 | A * | 9/1895 | Doerhoefer | | 73/333 |
| 652,474 | A * | 6/1900 | Cook | | 73/333 |
| 749,809 | A * | 1/1904 | Truman | | 137/614.16 |
| 764,900 | A * | 7/1904 | Schalt | | 137/614.17 |
| 1,339,383 | A * | 5/1920 | Beese | | 73/333 |
| 1,388,602 | A * | 8/1921 | Rotteleur | | 137/512 |
| 1,675,979 | A * | 7/1928 | Laird | | 137/515.5 |
| 1,677,562 | A * | 7/1928 | Robertson et al. | | 137/533 |
| 1,714,434 | A * | 5/1929 | O'Bannon | | 137/533.11 |
| 2,137,402 | A * | 11/1938 | Hoferer et al. | | 137/533.15 |
| 2,481,183 | A * | 9/1949 | Welby | | 251/228 |
| 2,598,598 | A * | 5/1952 | Pierce | | 137/559 |
| 2,607,227 | A * | 8/1952 | Biscoe | | 73/333 |
| 3,886,796 | A * | 6/1975 | Gruett | | 73/328 |
| 4,070,237 | A * | 1/1978 | Woodward | | 137/533.15 |
| 4,105,044 | A * | 8/1978 | Davitt | | 137/517 |
| 4,345,468 | A * | 8/1982 | Jackson | | 73/326 |
| 4,655,078 | A * | 4/1987 | Johnson | | 137/559 |
| 4,693,117 | A * | 9/1987 | Mills | | 73/326 |
| 4,838,095 | A * | 6/1989 | Sheridan et al. | | 137/551 |
| 5,004,005 | A * | 4/1991 | Graves | | 137/269.5 |
| 5,052,224 | A * | 10/1991 | Ford et al. | | 73/325 |
| 5,323,653 | A * | 6/1994 | Gruett | | 73/326 |
| 5,323,654 | A * | 6/1994 | Newman | | 73/326 |
| 5,383,360 | A * | 1/1995 | Bertani | | 73/323 |
| 5,442,159 | A * | 8/1995 | Shank | | 219/633 |
| 5,628,231 | A * | 5/1997 | Sheridan | | 73/323 |
| 5,648,607 | A * | 7/1997 | Wolf | | 73/332 |
| 6,234,018 | B1 * | 5/2001 | Kelada | | 73/323 |
| 7,178,544 | B2 * | 2/2007 | Robison | | 137/614.17 |

* cited by examiner

*Primary Examiner* — Craig Schneider
*Assistant Examiner* — Craig J Price
(74) *Attorney, Agent, or Firm* — Guy McClung

(57) ABSTRACT

An apparatus for controlling the flow of fluid may include a main passageway for conducting the fluid and the valve which may include a rotatable valve cavity having a ball check. The rotatable valve cavity may be rotatable with respect to the main passageway to provide at least three positions including a bypass position, a closed position and a run position. The valve may include an outlet for connection to the sight glass, and the apparatus may include a bleeder valve. The apparatus may include a sight glass which may be in fluid communication with the valve.

13 Claims, 6 Drawing Sheets

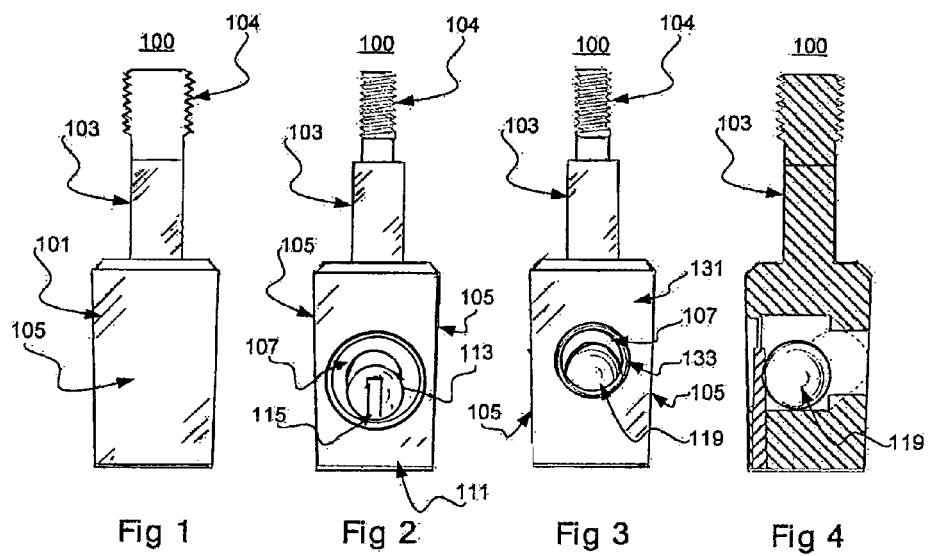

VESSEL    Fig. 13

VESSEL

BIDIRECTIONAL SLEEVED/PLUG BALL CHECK VALVE

FIELD OF THE INVENTION

The present invention relates to devices and methods for valves for controlling the fluid which flows through sight gages and more particularly to a valve with the bypass passageway for a safety sight gauge for visually inspecting liquid level or presence in vessels and sight flow monitoring for piping systems, reactors and the like.

BACKGROUND

Liquid sight indicators are used as liquid level gauges for vessel inventory estimation and sight flow monitors for piping system flow indication (bull's eye), or as observation sites for process equipment such as reactors, heaters, storage vessels and the like. Sight gauges are typically externally mounted on a vessel or pipe and connected between two mounting blocks attached within the range of liquid movement to indicate the presence and/or level of liquid therein. Gauges for visual indication employ transparent tubular conduits of an inert substance such as glass mounted between the mounting blocks. Breakage of the glass tube is a concern.

Many inventors have described sight gauges that improve safety by externally shielding the glass sight tube. Examples of prior art sight gauges are described in the following patents:

Kelada, U.S. Pat. No. 6,234,018 describes a safety liquid level sight gauge with a transparent sight tube coaxially disposed between mounting blocks and concentrically within a transparent shield tube which is protected by a metal sleeve with a sliding inspection window for observing the liquid level therein. The gauge includes a safety liquid level sight gauge with a transparent sight tube coaxially disposed between mounting blocks and concentrically within a transparent shield tube which is protected by a metal sleeve with a sliding inspection window for observing the liquid level therein. The gauge includes a sight tube breakage shut off system, and a leak shut off system. The breakage shut off system includes the transparent sight tube coaxially aligned between a pair of check valves within each mounting block. A check valve push rod is concentrically disposed and supported within the bore of the sight tube and urges both check valves to an open position allowing liquid to enter the bore of the sight tube. When the push rod collapses, such as when the sight tube is either cracked or broken, the check valve move to a closed position. The leak shut off system allows the check valves to move to a closed position when a pressure change occurs in the interstices formed between the transparent sight tube and the shield tube, the interstice is in communication with a diaphragm positioned on one end of a check valve activation plunger. The plunger is positioned between one end of the push rod and one check valve and moves perpendicularly to the push rod with a normal position that allows the push rod movement to be transferred to the check valve and a leak shut off position that allows the check valves to move to a closed position. A pressure change within the interstices influences the diaphragm to move the plunger to the leak shut off position closing the check valves.

Wolf, U.S. Pat. No. 5,648,607 describes a replaceable sight gauge assembly which includes two bolt assemblies. Each bolt assembly includes an entry bolt and an exit bolt, the entry bolt houses a valve which is opened when the exit bolt is mated therein the valve bolts provide a means for replacing the sight gauge.

Sheridan, U.S. Pat. No. 5,628,231 describes a sight glass for steam boilers which includes and flanges provided with molded inserts which serve to provide sealing means engaging the end surface of a sight glass. A concentrically disposed guard tube is also maintained in sealed relation to the end flanges. Tie rods to prevent excess tightening of the ended flanges are also provided.

Shank, U.S. Pat. No. 5,442,159 describes a sight gauge positioned between two spaced apart compression fittings which receive an elongated tubular transparent tube shield and a slightly longer concentrically placed sight tube.

Newman, U.S. Pat. No. 5,323,654 describes a shielded sight glass positioned between two spaced apart confronting fittings which are shielded by a polygon impact resistant plastic enclosure.

Gruett, U.S. Pat. No. 5,323,653 concerns a method for mechanically supporting a shield for a liquid gauge. The apparatus includes a support member, first and second end blocks which are slidable engagable with the support member while each has a passage way, seal borne by each of the end blocks and disposed in each of the passage ways and a transparent tube telescopingly received in the respective passage ways and defining a fluid passage way or chamber.

Bertani, U.S. Pat. No. 5,383,360 describes a column type level indicator with a means for its outward mounting through fixing screws with axial and transverse holes there through which act as ducts into the sight tube.

Ford et al., U.S. Pat. No. 5,052,224 describes a shielded vertically mounted sight gauge with a transparent pipe extending between housings, while each housing includes a flange for receiving a larger transparent shielding pipe, one flange telescopingly receives the shield with a biasing means that urges against the shield pipe so that the flange can be moved away from the shield pipe and access gained to the sight tube.

Sheridan, et al. U.S. Pat. No. 4,838,095 describes a sight glass with sampling system and includes an inner transparent glass tube an outer concentric shield tube forming an interstices between the tubes and a drain for remaining leakage caused by fracture of the inner tube.

Mills, U.S. Pat. No. 4,693,117 describes a shielded tubular gauge for placement between two spaced apart fittings connected to a vessel to show the level of liquid in the vessel, including an elongated sheet of protective material slidable received in the U-shaped edges of the frame.

Jackson, U.S. Pat. No. 4,345,468 describes a level sight monitor which includes a double tube sight element. The internal glass element is connected to the liquid system being monitored. The external tube is transparent plastic and provides a protective shield to the internal pipe and is spaced apart from the internal tube with "O" rings fitted, preferably flanged inserts. The annulus between the two tubes can be environmentally purged.

Gruett, U.S. Pat. No. 3,886,796 describes a gauge for indicating liquid level in a tank with a transparent plastic tube disposed between a pair of hollow end members. a sight tube breakage shut off system, and a leak shut off system. The breakage shut off system includes the transparent sight tube coaxially aligned between a pair of check valves within each mounting block. A check valve push rod is concentrically disposed and supported within the bore of the sight tube and urges both check valves to an open position allowing liquid to enter the bore of the sight tube. When the push rod collapses, such as when the sight tube is either cracked or broken, the check valve move to a closed position. The leak shut off system allows the check valves to move to a closed position when a pressure change occurs in the interstices formed between the transparent sight tube and the shield tube, the interstice is in communication with a diaphragm positioned on one end of a check valve activation plunger. The plunger is positioned between one end of the push rod and one check valve and moves perpendicularly to the push rod with a normal position that allows the push rod movement to be transferred to the check valve and a leak shut off position that allows the check valves to move to a closed position. A pressure change within the interstices influences the diaphragm to move the plunger to the leak shut off position closing the check valves.

In today's industries, it is sometimes necessary to store large quantities of fluids in a large container. Since fluid is added and withdrawn, it is necessary to keep an accurate measurement of the amount of fluid within the container. In order to accomplish this task, a sight glass is often used. The level of the fluid is measured by an upper and lower inlet/outlet passageway which may be connected to a cylinder which may have a glass wall which may be calibrated to indicate the level of the fluid within the container. However, the glass is susceptible to breakage and leakage especially in an industrial situation. This could lead to a serious leakage of the fluid if left unchecked. However, a ball check valve has been employed in the upper and lower passageway which will seat in the passageway when the fluid begins to excessively flow in towards the sight glass. The ball check valve obstructs the flow of the fluid and prevents the leakage of the fluid.

Commonly, the ball check valve is used in conjunction with a gage cock valve which allows the user to restrict the flow of fluid to the sight glass. The method that is used to unseat the ball check for equalizing pressure between the vessel and the gage glass is unreliable. The operator is required to turn the valve wheel of the gage cock valve many rounds to seat the valve stem which pushes the ball off the seat slightly. Once the ball is off the seat, the operator can then slightly open the valve to create a slight gap for liquid to bypass the ball check. If the valve is open to far, the ball check will seat as a result of the flow of fluid.

Consequently, there is only a small margin for error. Problems can arise if one of the ports is slightly obstructed which frequently occurs because the ports are generally small. The gage cock valve frequently freezes up due to the exposed valve stem and internal plugging. Also, the gage cock valve is prone to leaks due to several sealing surfaces which results in costly repairs.

Many valves are subject malfunction when a contaminant becomes lodged between the interior surface of the valve and a ball check. This may result in the valve becoming inoperative due to the fact that the ball check may not seat properly, allowing fluid to flow past the ball check. In order to correct this operation, the valve may be replaced which is expensive in terms of time lost and the cost of the replacement valve.

SUMMARY

An apparatus for controlling the flow of fluid may include a main passageway for conducting the fluid and the valve which may include a rotatable valve cavity having a ball check. The rotatable valve cavity may be rotatable with respect to the main passageway to provide at least three positions including a bypass position, a closed position and a run position.

The valve may include an outlet for connection to the sight glass, and the apparatus may include a bleeder valve.

The apparatus may include a sight glass which may be in fluid communication with the valve.

BRIEF DESCRIPTION OF THE DRAWINGS

The invention may be understood by reference to the following description taken in conjunction with the accompanying drawings, in which, like reference numerals identify like elements, and in which:

FIG. 1 illustrates a side view of the valve body of the present invention;

FIG. 2 illustrates a front view of the valve body of the present invention;

FIG. 3 illustrates a back view of the valve body of the present invention;

FIG. 4 illustrates a cross-sectional view of the valve body of the present invention and a passageway;

DETAILED DESCRIPTION

Figure 5:
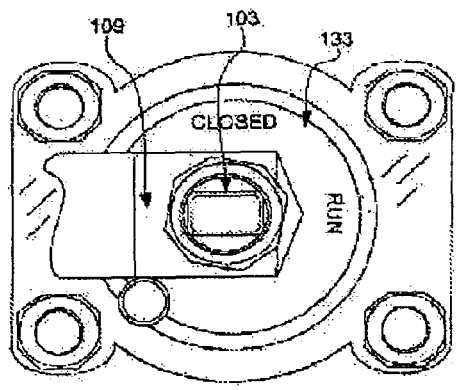
FIG. 5 illustrates a top view of the valve body in a first position.

The present invention may include a valve body which may be rotated substantially 180° in order to allow the fluid to flow through the valve body and respectively in the reverse direction with respect to the valve body. Consequently, when a contaminant becomes lodged with respect to the valve ball (cock ball), the valve body may be rotated substantially 180° to allow the fluid to flow in the reverse direction with respect to the valve body. As a consequence of this reverse flow, the contaminant may be washed away from being lodged between the ball check and the valve seat. The valve body may be rotated substantially 180° to return the valve body to substantially the initial position. This operation allows the valve to be cleared with a simple operation which can be performed in a short amount of time and does not require the replacement of the valve. This saves time and cost.

FIG. 1 illustrates a valve plug 100 which may include a valve shaft 103 which may be rotated in order to control the position of the valve body 101 and to control the operation of the valve plug 100 and which may include a valve body 101 to house a valve cavity 107 (valve passageway). FIG. 1 additionally illustrates the side surface 105 of the valve body 101 which may be opposed to a mirrored side surface 105. An end of the valve shaft 103 may include external threads 104 for attachment to a valve handle 109 (not shown).

FIG. 2 illustrates a front view of the valve plug 100 and the valve body 101 which may include a front surface 111 and the front surface 111 may include a front aperture 113 to provide a passageway to the valve cavity 107. The valve cavity 107 may include an upward extending projection 115 which may extend into the valve cavity 107 to restrict the movement of a ball check 119 within the valve cavity 107 and the front aperture 113 may be of larger diameter or larger dimension to allow the flow of fluid around the ball check 119.

FIG. 3 illustrates a back view of the valve plug 100 and illustrates a back surface 131 of the valve body 101 which may include a back aperture 133 to form a passageway into the valve cavity 107. The back aperture 133 may have a smaller diameter or a smaller dimension than the ball check 119 in order that the ball check 119 may block or restrict the flow of fluid from the passageway out of the valve cavity 107 when there is a flow rate of the fluid which exceeds a predetermined value which may occur when there is a break in the container of the fluid (not shown).

FIG. 4 illustrates a cross-sectional view of the valve plug 100 and illustrates the ball check 119 and the valve shaft 103. The plug cavity has a bottom surface and an inclined surface 155, the inclined surface between the bottom surface and the interior valve seat 137, the valve further comprising a recess defined by a surface of the upward projection 115, the bottom surface of the plug cavity and the inclined surface, the recess for holding the ball check 119 when fluid is flowing through the valve.

FIG. 5 illustrates a cover 133 to cover the sleeved valve 100 over the main passageway 135 and a handle 109 to cooperate with the valve shaft 103 to rotate the valve body 101 to at least three positions. The cover 133 may include indicia to indicate the position for example run, closed or bypass. FIG. 5 may indicate that the valve body is in a run position which may allow the fluid to flow in either direction as long as the flow rate does not exceed a predetermined value. When the flow rate exceeds the predetermined value for example if the flow is flowing right to left, the ball check 119 may move from a rest position to cooperate with a valve seat 137 to substantially seal the flow of fluid once a predetermined flow rate has been exceeded. If there was a break in the main passage way 135, the flow rate of the fluid would exceed the predetermined flow rate as the fluid leaks out of the break. The seal between the ball check 119 and the valve seat 137 would prevent a large loss of fluid. Thus if the sleeved valve 100 is used in conjunction with a large vessel of fluid, the seal between the ball check 119 and valve seat 137 may prevent a large loss of fluid from the vessel.

Figure 6:
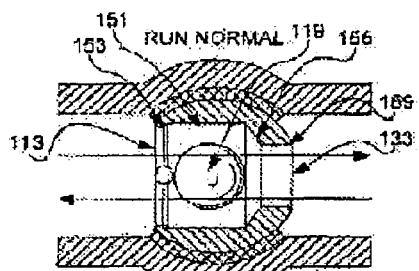
FIG. 6 illustrates a top cross-sectional of the valve body in the first position.

FIG. 6 illustrates a top view of the valve cavity 107 which may be defined by a cylinder surface 151 which may extend to a first reduced diameter cylinder surface 153 which may extend to the front aperture 113 and which may extend to an inclined surface 155 which may extend to a second reduced diameter cylinder surface 159 which may extend to the back aperture 133.

Figure 7:
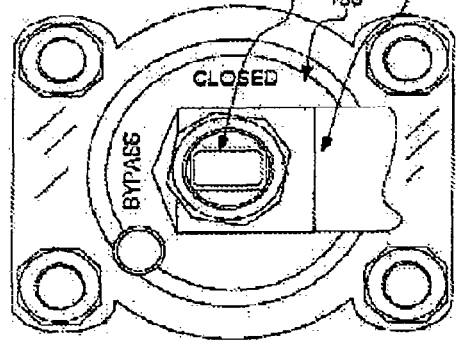
FIG. 7 illustrates a top view of the valve body in a second position.

FIG. 7 illustrates a cover 133 to cover the sleeved valve 100 over the main passageway 135 and a handle 109 to cooperate with the valve shaft 103 to rotate the valve body 101 to at least three positions. The cover 133 may include indicia to indicate the position for example run, closed or bypass. FIG. 7 may indicate that the valve body is in a bypass position which may allow the fluid to flow in one direction regardless of the flow rate and does not inhibit the flow rate even if the flow rate exceeds a predetermined value. The flow of the fluid keeps the ball check 119 and the valve seat 137 from coming together and providing a seal. In the bypass position, if a contaminate becomes lodged between the ball check 119 and the valve seat 137, the reverse flow of the fluid will push the ball check 119 away from the valve seat 137 and the fluid will carry the contaminant away.

Figure 8:
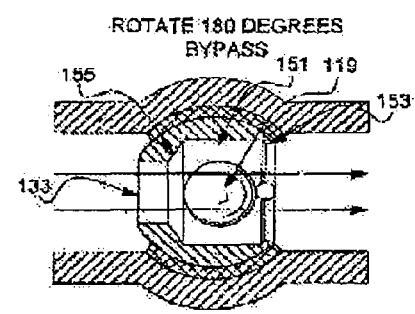
FIG. 8 illustrates a top cross-sectional view of the valve body in the second position.

FIG. 8 illustrates a top view of the valve cavity 107 in the bypass position which may be defined by a cylinder surface 151 which may extend to a first reduced diameter cylinder surface 153 which may extend to the front aperture 113 and which may extend to a inclined surface 155 which may extend to a second reduced diameter cylinder surface 159 which may extend to the back aperture 133.

Figure 9:
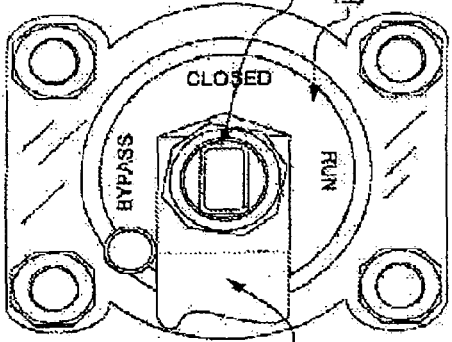
FIG. 9 illustrates a top view of the valve body in a third position.

FIG. 9 illustrates a cover 133 to cover the sleeved valve 100 over the main passageway 135 and a handle 109 to cooperate with the valve shaft 103 to rotate the valve body 101 to at least three positions. The cover 133 may include indicia to indicate the position for example run, closed or bypass. FIG. 7 may indicate that the valve body is in a closed position which may not allow the flow of fluid in any direction regardless of the flow rate. Both the front aperture 113 and the back aperture 133 are blocked by the main passageway 135.

Figure 10:
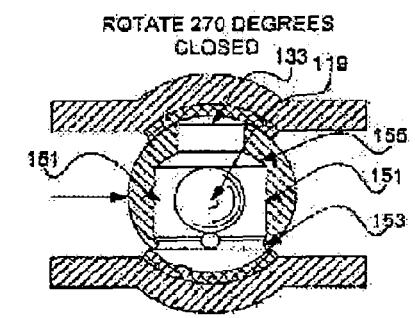
FIG. 10 illustrates a top cross-sectional view of the valve body in the third position.

FIG. 10 illustrates a top view of the valve cavity 107 which may be defined by a cylinder surface 151 which may extend to a first reduced diameter cylinder surface 153 which may extend to the front aperture 113 and which may extend to a inclined surface 155 which may extend to a second reduced diameter cylinder surface 159 which may extend to the back aperture 133.

Figure 11:
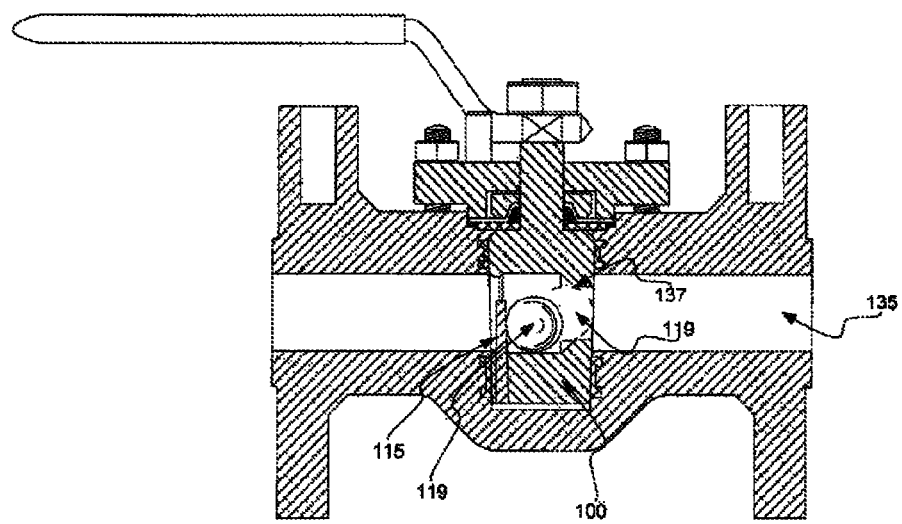
FIG. 11 illustrates a side cross sectional view of the valve body positioned within a passageway.

FIG. 11 illustrates the sleeved valve 100 positioned within the main passageway 135 and illustrates the ball check 119 at a resting position adjacent to the upward extending projection 115. This allows flow of the fluid in either direction since the ball check 119 is not positioned within the valve seat 137. However, when the flow of the fluid reaches a predetermined level, the fluid flow causes the ball check 119 to move to a second position indicated by the phantom line and adjacent to the valve seat 137 to prevent the flow of the fluid in the direction as shown left to right.

Figure 12:
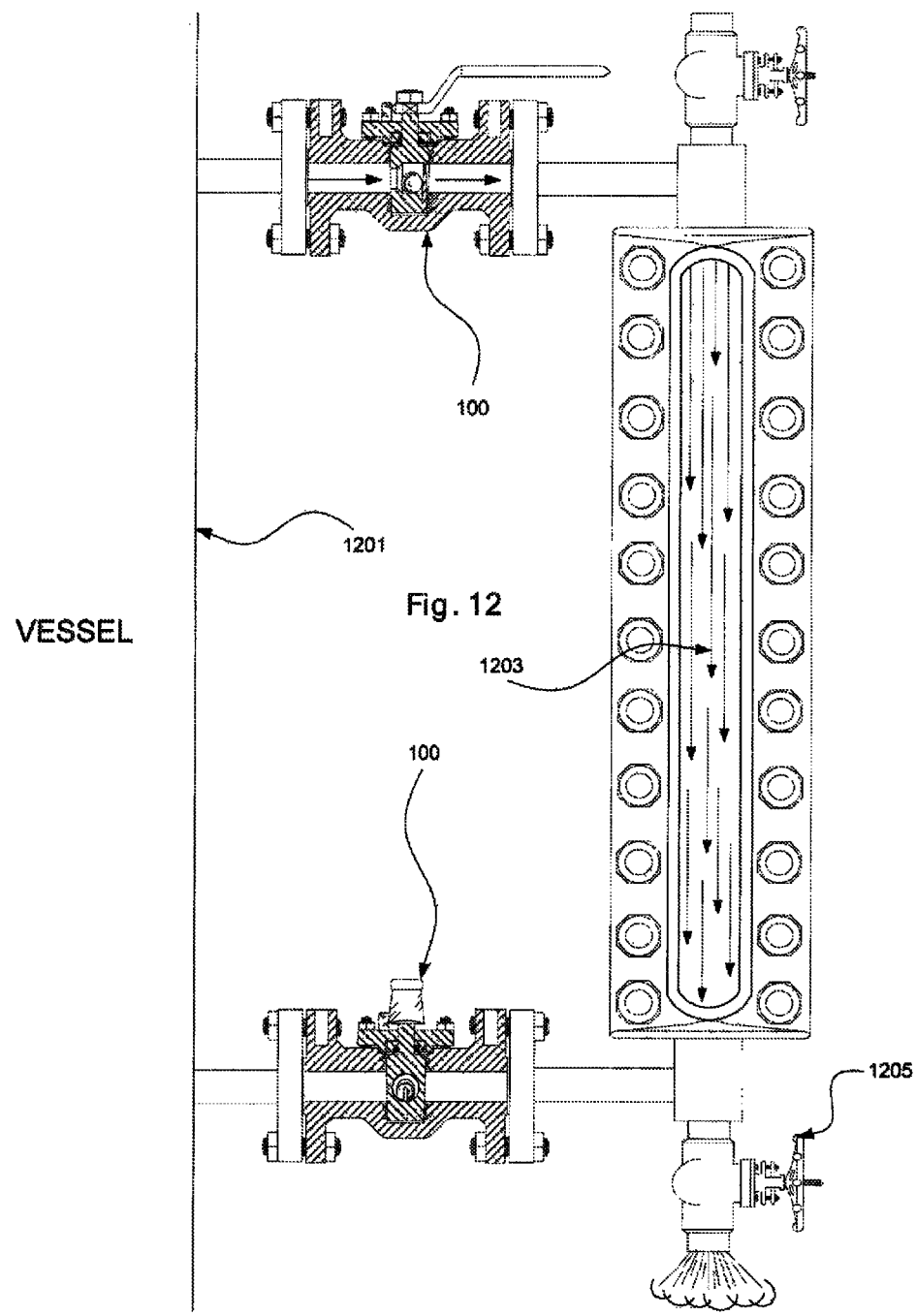
FIG. 12 illustrates a system of the present invention to determine if a tap is plugged.
Figure 13:
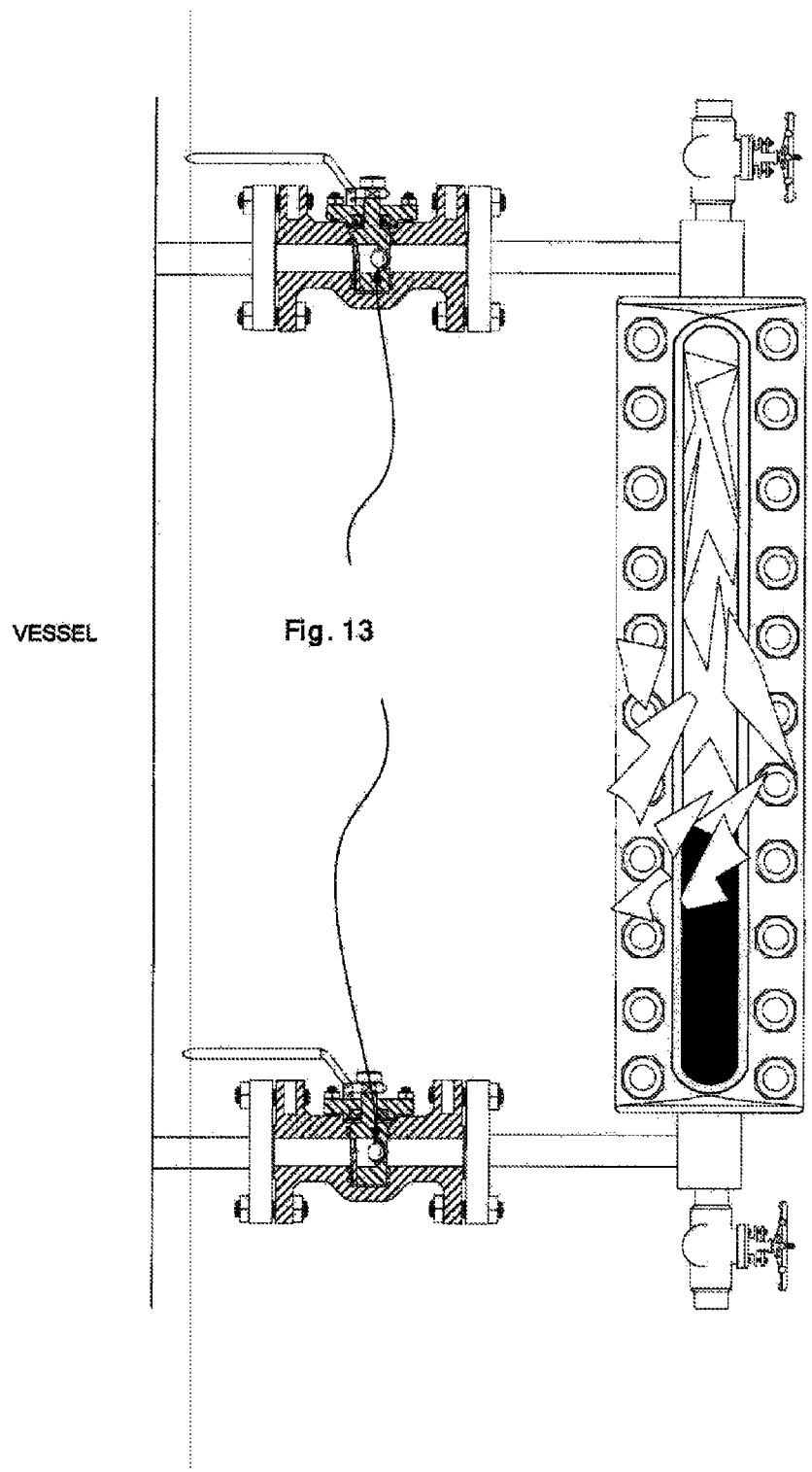
FIG. 13 illustrates a system of the present invention to prevent a high pressure liquid from escaping.
Figure 14:
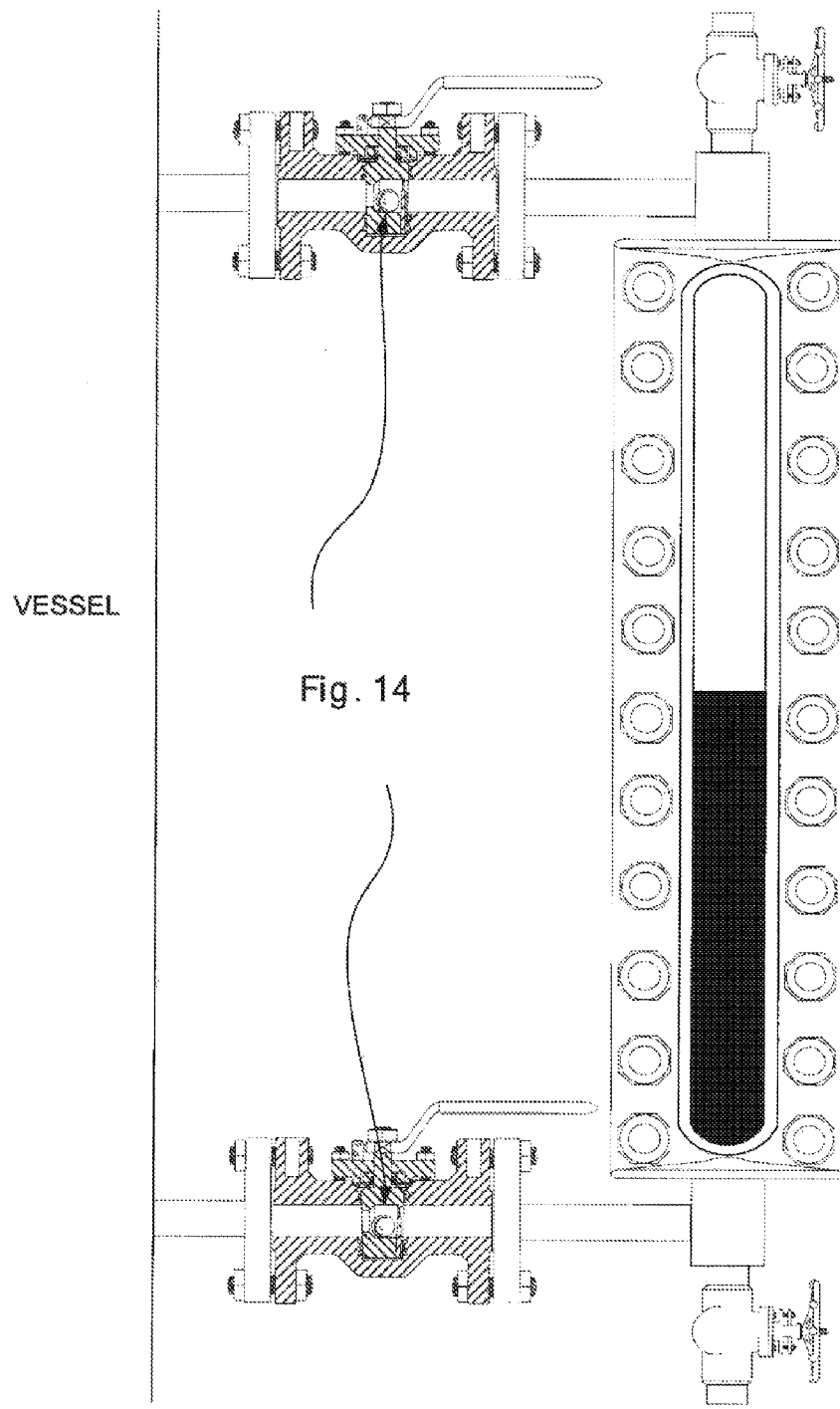
FIG. 14 illustrates a system of the present invention to verify liquid level in the vessel.

FIG. 12 illustrates a system of the present invention which may include a vessel 1201 and a sight glass 1203 which may be interconnected with a first sleeved valve 100 (shown as the upper valve) and a second sleeved valve 100 (shown as the lower valve) where the first sleeved valve 100 may be in a bypass position and the second sleeved valve 100 may be in a closed position in order to verify if a tap is plugged by opening the bottom bleeder valve 1205. If a vapor is allowed to flow through the bottom bleeder valve 1205 the tap is clear.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed

The invention claimed is:

1. An valve for fluid flow control, comprising:
   a body with a first body side and a second body side;
   a main passageway through the body for conducting a fluid through the valve, the main passageway comprising a first passage opening at the first body side and a second passage opening at the second body side;
   a valve plug extending into the valve body and having a plug cavity positioned within the main passageway so that the fluid flowing through the main passageway may flow through the plug cavity;
   the plug cavity having
      a first plug side and a second plug side,
      a first opening on the first plug side through which the fluid may flow to and from the main passageway with respect to the plug cavity,
      a second opening on the second plug side through which the fluid may flow to and from the main passageway with respect to the plug cavity, the first plug side opposite the second plug side,
the first opening larger than the second opening, and
an interior valve seat;
the valve plug selectively rotatable in the body (a) to permit bidirectional fluid flow through the plug cavity and therefore through the valve in a "run" position, (b) to close the valve to the fluid flow in a "closed" position, and (c) to permit bypass fluid flow through the valve in a "bypass" position; and
the valve plug having a ball check movably located within the plug cavity, the ball check movable by action of the fluid flowing through the main passageway into the plug cavity to seat against the valve seat to prevent the fluid flow through the valve, the ball check passable through the first opening, the plug cavity having a cavity top and a cavity bottom, an upward projection extending from the cavity bottom of the plug cavity into the plug cavity, the upward projection having a projection top, the projection top located below spaced-apart from and not in contact with the cavity top, the upward projection located for maintaining the ball check in the plug cavity and preventing the ball check from passing through the first opening and into the main passageway and from exiting the valve body.

2. The valve of claim 1 wherein
the ball check has a ball diameter and the upward projection has a projection height, the ball diameter greater than the projection height, and
the upward projection has a projection diameter, the ball diameter greater than the projection diameter.

3. The valve of claim 1 wherein
the plug cavity has a bottom surface and an inclined surface, the inclined surface between the bottom surface and the interior valve seat, the valve further comprising
a recess defined by a surface of the upward projection, the bottom surface of the plug cavity and the inclined surface, the recess for holding the ball check when the fluid is flowing through the valve.

4. The valve of claim 3 wherein the plug cavity is of sufficient diameter to permit the fluid flow around the ball check and
with the valve plug in a bypass position, (a) the fluid flow is able to push the ball check away from the interior valve seat and carry away a contaminate lodged between the ball check and the interior valve seat, and (b) the upward projection prevents the ball check from exiting the plug cavity.

5. The valve of claim 1 further comprising
the body having a body top,
the valve plug having a shaft projecting beyond the body top, and
a handle connected to the valve shaft for rotating the valve plug to select a valve plug position.

6. The valve of claim 5 wherein rotating the handle one hundred eighty degrees rotates the valve plug between a bypass position and a run position.

7. An valve for fluid flow control, comprising:
a body with a first body side and a second body side;
a main passageway through the body for conducting a fluid through the valve, the main passageway comprising a first passage opening at the first body side and a second passage opening at the second body side;
a valve plug extending into the valve body and having a plug cavity positioned within the main passageway so that the fluid flowing through the main passageway may flow through the plug cavity;
the plug cavity having a first plug side and a second plug side,
a first opening on the first plug side through which the fluid may flow to and from the main passageway with respect to the plug cavity,
a second opening on the second plug side through which the fluid may flow to and from the main passageway with respect to the plug cavity,
the first plug side opposite the second plug side, and
an interior valve seat;
the valve plug selectively rotatable in the body (a) to permit bidirectional fluid flow through the plug cavity and therefore through the valve in a "run" position, (b) to close the valve to the fluid flow in a "closed" position, and (c) to permit bypass fluid flow through the valve in a "bypass" position;
the valve plug having a ball check movably located within the plug cavity, the ball check movable by action of the fluid flowing through the main passageway into the plug cavity to seat against the valve seat to prevent the fluid flow through the valve; the ball check passable through the first opening;
the plug cavity having a cavity top and a cavity bottom, and
an upward projection extending from the cavity bottom of the plug cavity into the plug cavity, the upward projection having a projection top, the projection top located below spaced-apart from and not in contact with the cavity top,
the upward projection located for maintaining the ball check in the plug cavity and preventing the ball check from passing through the first opening and into the main passageway and from exiting the valve body.

8. A fluid system comprising
a vessel, a first valve, a second valve, and a sight glass;
each of the first valve and the second valve comprising
a body with a first body side and a second body side,
a main passageway through the body for conducting a fluid through the valve, the main passageway comprising a first passage opening at the first body side and a second passage opening at the second body side,
a valve plug extending into the valve body and having a plug cavity positioned within the main passageway so that fluid flowing through the main passageway may flow through the plug cavity,
the plug cavity having
a first plug side and a second plug side,
a first opening on the first plug side through which fluid may flow to and from the main passageway with respect to the plug cavity,
a second opening on the second plug side through which the fluid may flow to and from the main passageway with respect to the plug cavity,
the first plug side opposite the second plug side, and
an interior valve seat,
the valve plug selectively rotatable in the body (a) to permit bidirectional fluid flow through the plug cavity and therefore through the valve in a "run" position, (b) to close the valve to the fluid flow in a "closed" position, and (c) to permit bypass fluid flow through the valve in a "bypass" position, and
the valve plug having a ball check movably located within the plug cavity, the ball check movable by action of the fluid flowing through the main passageway into the plug cavity to seat against the valve seat to prevent fluid flow through the valve;
the first valve for controlling fluid flow in a first the fluid flow conduit between the vessel and the sight glass;

the second valve for controlling fluid flow in a second the fluid flow conduit between the vessel and the sight glass; and each ball check movable to seat against a corresponding interior valve seat upon breakage of the sight glass to prevent outflow of the fluid from the vessel through the broken sight glass, wherein each of the first valve and the second valve comprises the ball check passable through the first opening, the plug cavity having a cavity top and a cavity bottom, an upward projection extending from the cavity bottom of the plug cavity into the plug cavity, the upward projection having a projection top, the projection top located below spaced-apart from and not in contact with the cavity top, the upward projection located for maintaining the ball check in the plug cavity and preventing the ball check from passing through the first opening and into the main passageway and from exiting the valve body, the ball check has a ball diameter and the upward projection has a projection height, the ball diameter greater than the projection height, and the upward projection has a projection diameter, the ball diameter greater than the projection diameter.

9. The fluid system of claim 8 wherein for each of the first valve and the second valve the first opening of the plug cavity is larger than the second opening of the plug cavity.

10. The fluid system of claim 8 wherein for each of the first valve and the second valve the plug cavity is of sufficient diameter to permit the fluid flow around the ball check and with the valve plug in a bypass position, (a) the fluid flow is able to push the ball check away from the interior valve seat and carry away a contaminate lodged between the ball check and the interior valve seat, and (b) the upward projection prevents the ball check from exiting the plug cavity.

11. The fluid system of claim 8 further comprising a bleeder valve in fluid communication with the sight glass and the second valve.

12. The fluid system of claim 8 wherein in each of the first valve and the second valve the plug cavity has a bottom surface and an inclined surface, the inclined surface between the bottom surface and the interior valve seat, and the valve includes a recess defined by a surface of the upward projection, the bottom surface of the plug cavity and the inclined surface, the recess for holding the ball check when the fluid is flowing through the valve.

13. A fluid system comprising a vessel, a first valve, a second valve, and a sight glass;

each of the first valve and the second valve comprising a body with a first body side and a second body side, a main passageway through the body for conducting a fluid through the valve, the main passageway comprising a first passage opening at the first body side and a second passage opening at the second body side, a valve plug extending into the valve body and having a plug cavity positioned within the main passageway so that the fluid flowing through the main passageway may flow through the plug cavity, the plug cavity having a first plug side and a second plug side, a first opening on the first plug side through which the fluid may flow to and from the main passageway with respect to the plug cavity, a second opening on the second plug side through which the fluid may flow to and from the main passageway with respect to the plug cavity, the first plug side opposite the second plug side, and an interior valve seat, the valve plug selectively rotatable in the body (a) to permit bidirectional fluid flow through the plug cavity and therefore through the valve in a "run" position, (b) to close the valve to the fluid flow in a "closed" position, and (c) to permit bypass fluid flow through the valve in a "bypass" position, and the valve plug having a ball check movably located within the plug cavity, the ball check movable by action of the fluid flowing through the main passageway into the plug cavity to seat against the valve seat to prevent the fluid flow through the valve;

the first valve for controlling the fluid flow in a first fluid flow conduit between the vessel and the sight glass;

the second valve for controlling the fluid flow in a second fluid flow conduit between the vessel and the sight glass; and each ball check movable to seat against a corresponding interior valve seat upon breakage of the sight glass to prevent outflow of the fluid from the vessel through the broken sight glass;

for each of the first valve and the second valve the first opening of the plug cavity is larger than the second opening of the plug cavity and the first opening of the plug cavity is larger than the second opening of the plug cavity;

each of the first valve and the second valve comprises the ball check passable through the first opening, the plug cavity having a cavity top and a cavity bottom, an upward projection extending from the cavity bottom of the plug cavity into the plug cavity, the upward projection having a projection top, the projection top located below spaced-apart from and not in contact with the cavity top, the upward projection located for maintaining the ball check in the plug cavity and preventing the ball check from passing through the first opening and into the main passageway and from exiting the valve body, the ball check has a ball diameter and the upward projection has a projection height, the ball diameter greater than the projection height, and the upward projection has a projection diameter, the ball diameter greater than the projection diameter.

* * * * *